June 10, 1958  R. W. GILBERT  2,838,232
ARRANGEMENT FOR CONVERTING A MECHANICAL
TORQUE TO A D.-C. CURRENT
Filed Nov. 25, 1952  3 Sheets-Sheet 3

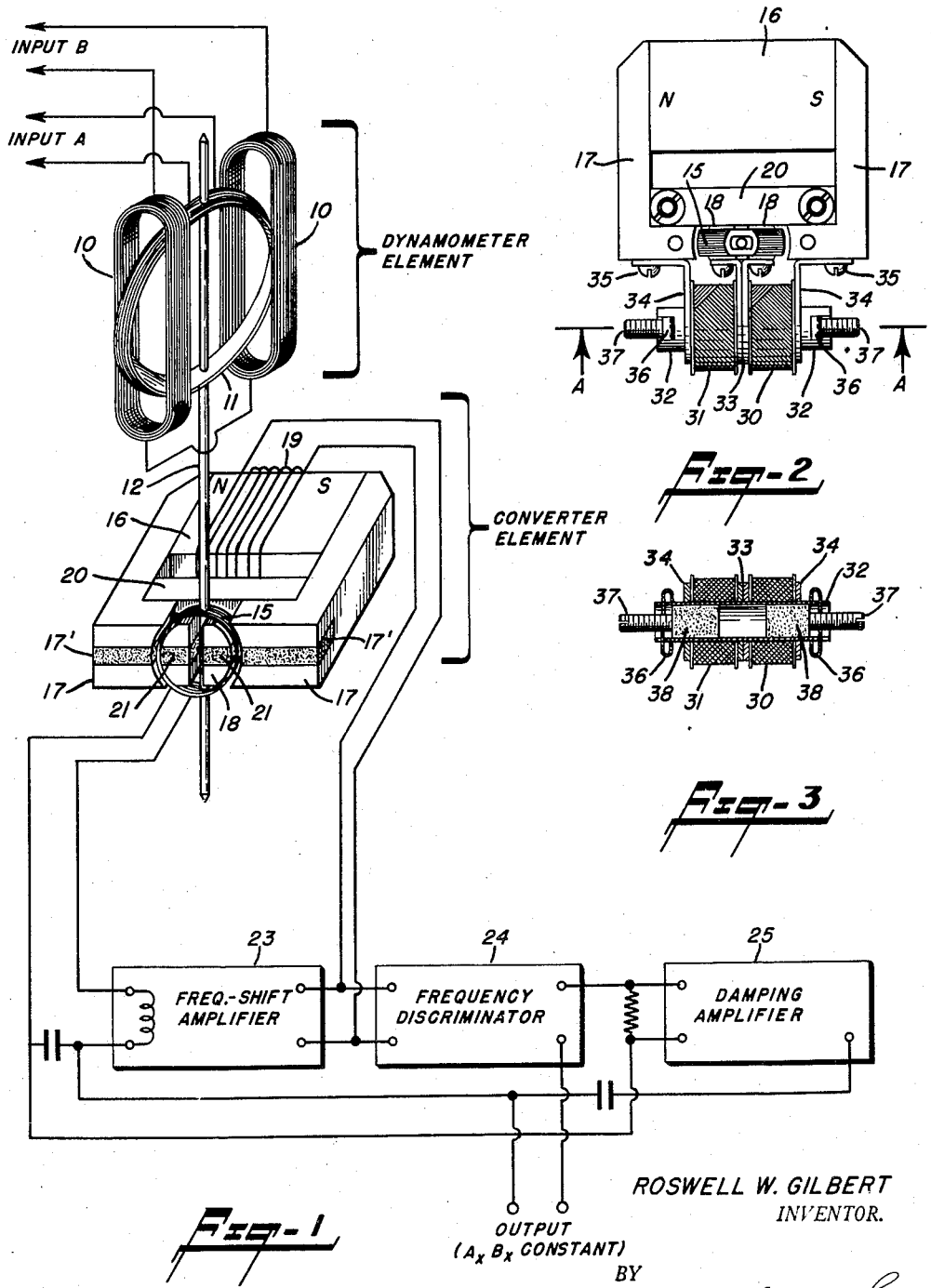

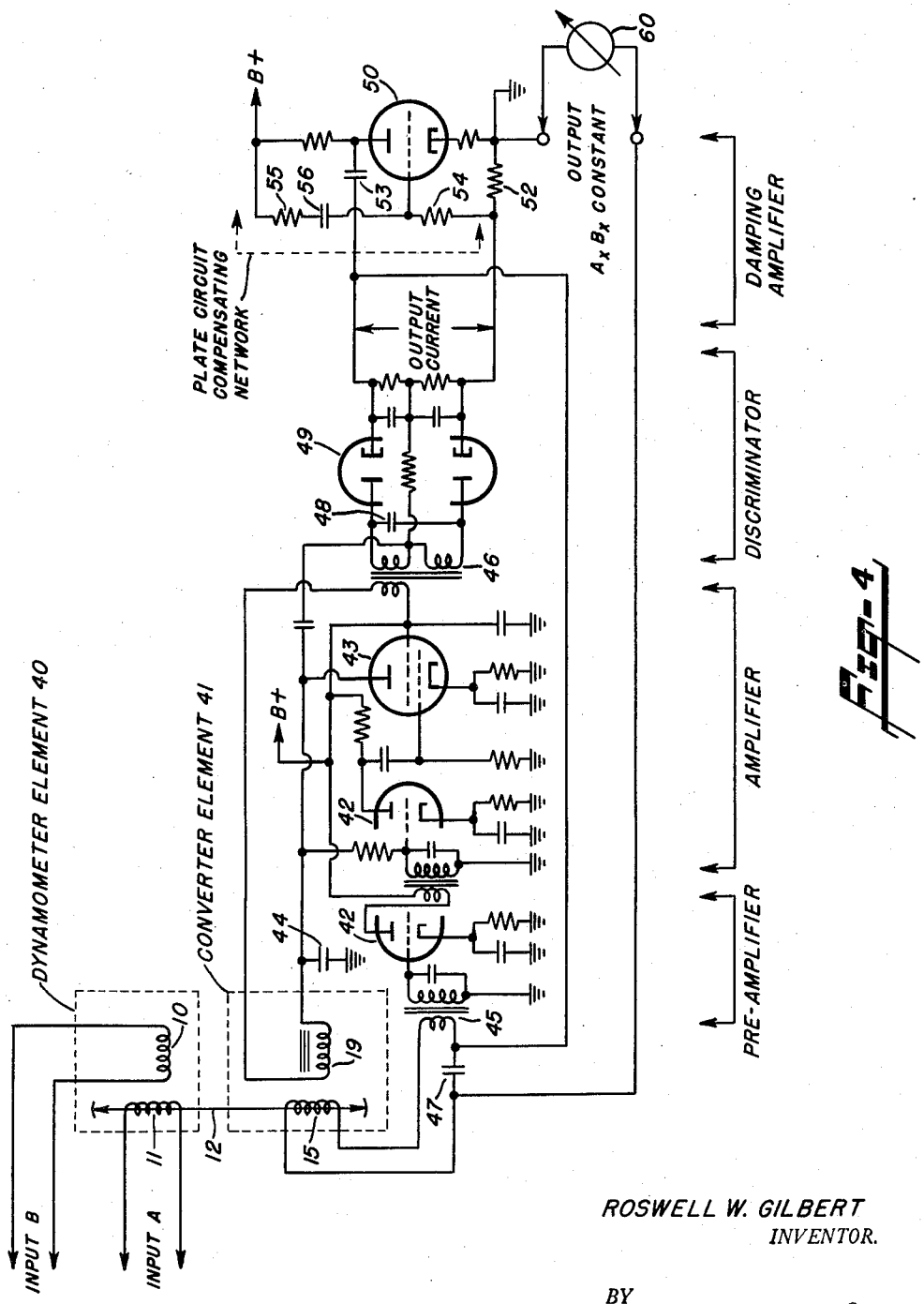

ROSWELL W. GILBERT
INVENTOR.

BY
Taylor, Kellis Quick
ATTORNEYS

United States Patent Office 2,838,232
Patented June 10, 1958

2,838,232
ARRANGEMENT FOR CONVERTING A MECHANICAL TORQUE TO A D.-C. CURRENT

Roswell W. Gilbert, Montclair, N. J., assignor, by mesne assignments, to Daystrom, Incorporated, Murray Hill, N. J., a corporation of New Jersey Application November 25, 1952, Serial No. 322,438

6 Claims. (Cl. 235—61)

This invention relates to a product resolver and more particularly to a novel electrical arrangement for converting a primary torque into a single output current that varies as a function of the primary torque.

In a broad sense, my invention consists in an arrangement wherein a resultant torque produced by two primary elements separately responsive to the instantaneous state of two variable conditions is converted into a single electrical current that is a product function of the instantaneous states of both conditions. I accomplish this by balancing such resultant torque to a normal, or zero, value by means of an electromagnetic system that includes a movable member mechanically coupled to the torque producing elements. The novel system, to be described herein, is directly applicable to current-balance telemetering of A. C. or D. C. quantities, or to standard telephone or micro-wave circuits. Broadly, any telemetering system capable of accepting D. C. current may be extended to A. C. circuits by employing my product resolver system.

The invention will be described with specific reference to an analog computing system but those skilled in this art will have no difficulty in adapting the system to other specific uses.

Analog computing systems essentially comprise a plurality of amplifiers and associated feedback systems capable of expressing the various functions of linear differential equations. The computing system is arranged to simulate the parameters of such equations in simultaneous arrangements that would be extremely difficult of solution by the usual manual mathematics. In general, the involved functions are algebraic addition, integration, differentiation and multiplication, with differentiation usually avoided by rearranging the expressions into terms of integration.

The functions of addition and integration are quite readily obtainable by suitable amplifiers degenerated with resistance and reactance, respectively, but multiplication to produce a product function of two variables has proven rather difficult of practicable attainment. In a network sense, a product function can be developed within a non-linear element having a log function of magnitude, such as a thermo-element or a thermionic diode, but these prove of inadequate precision and stability in practice. It, therefore, is common practice to develop the log function by resort to servo systems including logarithmically wound rheostats. These, however, seriously restrict the resolution speed of the entire system and are expensive and cumbersome in the accuracy bracket usually desired, namely, about 0.1%.

I develop the product function within a device of well-established precision, and electrodynamometer mechanism, and automatically establish an equivalent single output current as a function of the product of the two currents fed to the mechanism. In such case the electrodynamometer mechanism develops a mechanical torque that is proportional to the instantaneous product of the individual currents flowing in the field and movable coils. This torque is then balanced by a second mechanism having a permanent magnet field and a movable coil carrying a balancing output current developed by unbalance motion of the movable system. Such system has added thereto position sensing and amplification functions to make the balancing action automatic whereby the entire system functions as a product amplifier.

With further particular reference to the analog computer, such device, or system, requires a high resolution speed as well as high precision, primarily to follow input variations having high rates of change without instantaneous phase lags exceeding, dynamically, the required precision. In this sense the requirement differs from that of indicating instruments wherein the steady-state precision only is of major importance. In my system the response speed is a function of two factors, namely, the system inertia moment and the restoring-force deflection characteristic of the balancing system. These combine as the square root of their product to determine the periodic response-time. Thus, it is essential to fast response to have high resolution in the detection of unbalance motion for a torque correction, or a stiff system. For this purpose I have found the induction galvanometer principle ideally suited, such system being disclosed in my United States Patent No. 2,486,641 issued November 1, 1949. The induction galvanometer is capable of position sensing within the region of a few seconds of angle and can be made to serve as a torque balance by applying the output current of the system to the movable coil of the induction galvanometer.

My proposed system, then, comprises an electro-dynamometer mechanism and an induction galvanometer mechanism mounted as a single movement in combination with a carrier-frequency amplifier and discriminator to develop an output current in the galvanometer coil for mechanical torque balance against the electrodynamometer element. In accordance with usual induction galvanometer performance the angular rotation of the mechanism may readily be restricted to a very small angle, the system wil be stiff mechanically, and the overall response is very rapid. Damping, if required, is obtained by including feedback reactance between the output circuit and the galvanometer movable coil to develop a component proportional to rate-of-change of the output current. The damping force of this arrangement can be made considerably greater than that of a conventional damping resistance across the galvanometer coil.

Some secondary advantages attendant to an essentially stationary mechanism developing pure torque with negligible motion are apparent. The dynamometer element may be adjusted to the optimum point of zero mutual inductance thereby eliminating a source of error usual to indicating dynamometers. Thus, my system may advantageously be compared to conventional indicating instruments in terms of basic accuracy. Also, the conductive isolation of input and output circuits will allow the totalization of a number of such systems by the addition of the several output currents.

An object of this invention is the provision of an arrangement comprising a primary, torque-producing element responsive to the instantaneous state of a variable condition, an electro-magnetic device adapted to balance the torque of the primary element, and means responsive to the said electromagnetic device for producing a current that varies as a function of the torque of the primary element.

An object of this invention is the provision of a novel system for multiplying two input currents to produce a single output current that is a product function of the input currents, and which system has a resolution speed and precision heretofore unobtainable in systems of this class.

An object of this invention is the provision of a product resolver comprising an electrodynamometer mechanism and an induction galvanometer mechanism mounted on a single shaft in combination with a carrier frequency amplifier and discriminator to develop an output current in the galvanometer coil for mechanical torque balance against the electrodynamometer element.

An object of this invention is the provision of a system for multiplying two input currents to produce a single output current that is a product function of the input currents, said system comprising an electrodynamometer measuring mechanism having its field coil and movable coil energized by the two input currents, a shaft secured to the movable coil of the electrodynamometer, a permanent-magnet, movable-coil control mechanism in which the movable coil is secured to the said shaft, an A. C. field associated with the movable coil of said control mechanism said field developing in said movable coil an A. C. current component that varies in magnitude with the displacement of the coil from its normal zero position, a vacuum tube amplifier and discriminator circuit for developing in the movable coil of the control mechanism a current to return the coil to its normal zero position, said current being a function of the product of the two input currents.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

Figure 1 is a diagrammatic representation of my invention as applied to a system for obtaining a single output current that is a function of the product of two input currents;

Figure 2 is a top view showing the actual construction of the converter element;

Figure 3 is a sectional view taken along the line A—A of Figure 2;

Figure 4 is a circuit diagram of the system; and

Figure 5:
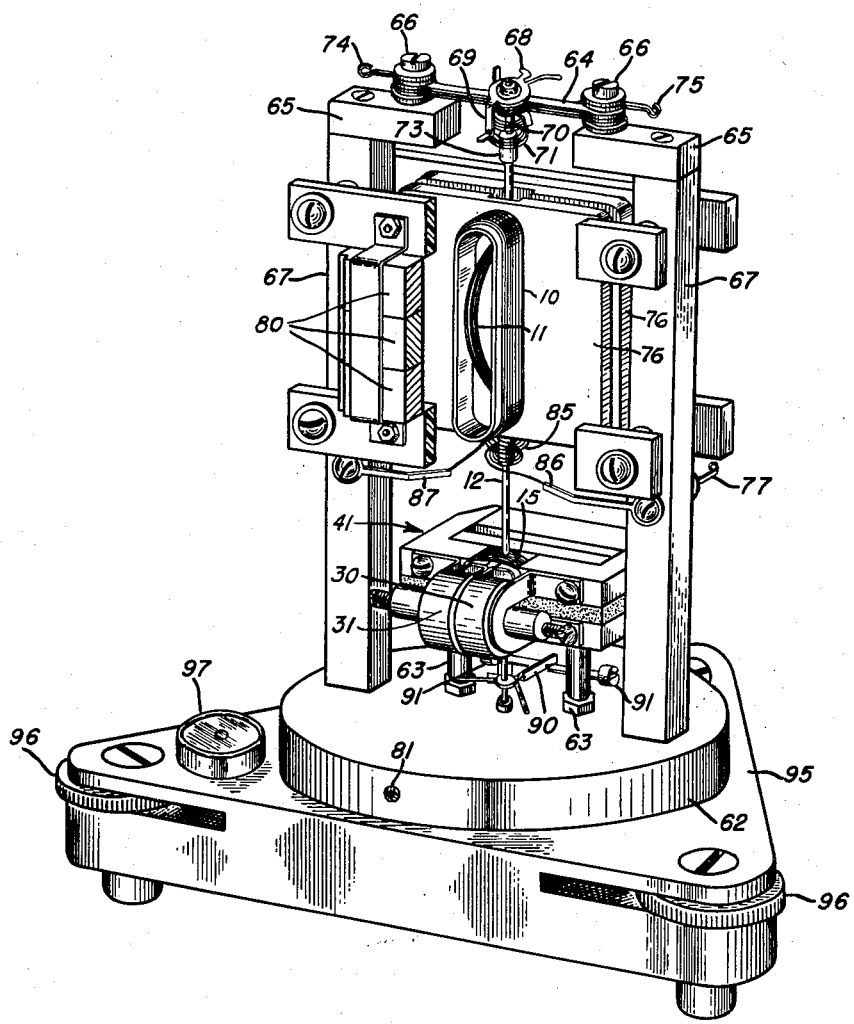
Figure 5 is an isometric view showing the assembly of the dynamometer and converter elements.

Reference is now made to Figure 1 wherein the dynamometer element is shown as comprising the field coils 10 and a movable coil 11, the latter being secured to a staff 12. It may here be pointed out that the dynamometer element generally is similar to that used in conventional dynamometer indicating instruments but in the present case such element affords two design advantages permitted by the negligible displacement angle of the movable coil. Specifically, the structure is designed for maximum differential coupling by flattening and compacting the field coils about the movable coil, as will become more apparent from Figure 5. This results in an efficiency gain of about 3 over a conventional deflection instrument of comparable size. Also, the mechanism operates at the point of zero mutual inductance thereby eliminating coupling difficulties as normally experienced in deflection instruments. As shown in the drawings, the two input currents are fed to the movable coil and field coils, the respective circuits being identified as Input A and Input B.

The converter element for deflection sensing and conversion to torque for balance against the dynamometer torque comprises a D. C. mechanism having its movable coil 15 secured to the common staff 12. This converter element essentially is similar to the induction galvanometer device disclosed in my United States Patent No. 2,486,641 issued November 1, 1949, and entitled "Measuring and Control Apparatus." Suffice to say, for present purposes, the induction galvanometer comprises the permanent magnet 16 that establishes a unidirectional magnetic flux field between the pole pieces 17 and the core 18. In accordance with conventional instrument practice, current is brought to the movable coil 15 by means of conventional hair springs (not shown in Figure 1) and the movable coil will rotate about the axis formed by the staff 12 in a direction and to an extent depending upon the magnitude of the D. C. current flowing therein. A varying magnetic flux field is also provided across the movable coil air gap by means of a coil 19, here shown diagrammatically as encircling the magnet 16, said coil being energized by an appropriate high-frequency current. It is apparent, therefore, that the movable coil 15 rotates in a magnetic flux gap that includes the steady flux field of the permanent magnet 16 and the varying flux field produced by the coil 19. When the movable coil is in its normal, zero-center position, as shown in the drawing, the A. C. field flux linkage is zero. However, deflection of the movable coil 15 causes such coil to link, proportionally, the A. C. component of the flux field and an A. C. potential is induced therein, such potential having a magnitude and phase proportional to the degree and direction of coil deflection. Thus, deflection of the movable coil 15, in response to the torque produced by the dynamometer element, will produce an A. C. current flow in the movable coil which can be extracted for amplification.

The developed A. C. coil potential is directly proportional to the frequency of the current flowing in the coil 19 and the operational quality of the mechanism is proportional to increasing frequency until limited by some secondary consideration such as losses in the field structure or the movable coil. The solid iron flux paths normally used in D. C. instrument structures are not efficient for the high-frequency component of the magnetic flux and, conversely, the magnetic materials suitable for high frequencies have permeabilities insufficient for the relatively high level of steady flux of the permanent magnet. I, therefore, employ a composite magnetic structure as disclosed in detail in my United States Patent No. 2,650,348, issued August 25, 1951, and entitled "Induction Galvanometer." Specifically, the pole pieces 17, made of soft-iron, are provided with milled slots, and rectangular blocks 17', of carbonyl iron powder bonded and insulated by a resin, are cemented or otherwise bonded in the pole-piece slots. The core 18, made of soft-iron and cemented, or brazed, to a bar 20 of non-magnetic material, is also provided with appropriate slots accommodating the powdered iron inserts 21. As shown in the drawings, the core also includes a transverse vertical slot through which the staff 12 passes. The non-magnetic bar 20 is secured to the pole pieces 17 whereby the core sections are spaced relative to the opposed pole pieces to provide tthe circular air gap for the coil 15. In order to provide as rapid a response as possible the entire movable system of the device should be rigid, and toward this end I prefer to make the movable coil 15 round with the staff 12 passing therethrough, such construction avoiding compliance by coil distortion under torque. The powdered iron inserts 17' and 21 provide a path for the high frequency alternating magnetic flux, and the soft-iron pole pieces 17 and core 18 provide a path for the steady unidirectional flux of the permanent magnet 16.

The converter element, therefore, serves to convert very small deflections of the staff 12 into a high-frequency component of voltage which is amplified by the amplifier 23, phase-rectified by the frequency discriminator 24 and fed back into the movable coil as a D. C. current to torque balance the system. The torque produced by the dynamometer element is, thereby, automatically converted into a proportionate D. C. output current. As an element, the dynamometer is recognized as being precisely responsive to the product of the currents flowing in the movable and field coils so that with an effective torque balance the D. C. output current of the system is precisely related to the product of the two input currents.

Since my system is operated at a very high feedback ratio, at least 50,000, and normally will oscillate despite the high phase velocity of the high-frequency amplifier section, it is necessary to provide dynamic damping by using a single stage damping amplifier 25 which is responsive to the output current and which feeds a derivative component of current back into the movable coil 15 of the induction galvanometer.

In Figure 1 the induction galvanometer converter element is shown diagrammatically. Reference is now made to Figures 2 and 3 which show the actual construction of such device. Figure 2 being a top view and Figure 3 being a sectional view taken along the line A—A of Figure 2. Here the high frequency field coil includes a pair of multiturn coils 30, 31 on a tube 32 of insulating material which is supported upon the magnetic field structure by brass, U-shaped brackets 33, 34 having their ends respectively secured to the pole pieces 17 and the core 18 by the screws 35. Centrally apertured spring clips 36 are resiliently retained upon the ends of the insulating tube 32 to form nuts through which are threaded screws 37 upon which short cylinders 38 of powdered iron in a resin binder are molded. The spring clamping arms of the spring clips 36 are located in notches at the ends of the tube 32 to prevent inadvertent rotation of the spring clips when the screws 37 are turned to adjust the powdered iron cylinders 38. Individual adjustment of the cylinders 38 alters the effective inductances of the coils 30, 31 and thereby tunes them to resonance at the desired operating frequency. For a more detailed description of the structural features of the converter element reference is made to my United States Patent No. 2,650,348, above cited.

Reference is now made to Figure 4 which is a circuit diagram of my system. The two input currents are fed to the movable coil 11 and field coils 10, of the dynamometer element 40, and the resulting electromagnetic reaction produces a torque in the staff 12 which torque produces a displacement of the movable coil 15 of the induction galvanometer converter element 41 from its normal, zero coupling position with respect to the high frequency field coil 19. The amplifier section, comprising one half of the vacuum tube 42 and the tube 43 normally is in stable oscillation and feeds oscillating current to the field coil 19 which is tuned to resonance by the capacitor 44. As explained hereinabove, deflection of the converter movable coil 15 produces therein an A. C. component of potential having a magnitude and phase-direction proportional to the degree and direction of coil deflection. This A. C. component is amplified by the pre-amplifier which consists of the other half of the vacuum tube 42. The input transformer 45 and the discriminator transformer 46 are of conventional cup-core construction and are resonated at the operating frequency of the system, say 200 kilocycles per second, by the associated capacitors 47, 48, respectively. The bulk of the output impedance is in the field coil 19 and its associated capacitor 44, with the discriminator transformer 46 coupled by inserting its primary winding in series with the field coil 19, as shown. This phases the discriminator properly. Actually, the primary winding of the discriminator transformer consists of a relatively few turns, the number of turns determining the coefficient of coupling between the separately-resonated field coil 19 and the secondary winding that is connected to the dual diode rectifier 49.

The discriminator is a conventional balanced type, as commonly used in radio practice, and is phased by the capacitive connection to the output stage plate. The D. C. output of the discriminator, therefore, is balanced at the center frequency of the current supplied to the field coil 19 and is polarized with respect to frequency shift as the movable coil 15 deflects from its normal, zero position. It is pointed out that the converter field coil 19 and the discriminator transformer secondary are separately tuned to the same center frequency and coupled. The coupling coefficient may, then, be selected to slightly overcouple the two resonant circuits to develop a double-peaked impedance and phase characteristic identified with the overcoupled condition. Overcoupling in proper amount provides a method of simple adjustment of the system to any desired incremental sensitivity about the center-frequency point and a relatively high sensitivity over reasonable excursions from such center point. A more detailed description of this feature will be found in my United States Patent No. 2,744,168, issued May 1, 1956, and entitled "D.-C. Amplifier."

A torque-balance system may be expected to have a much higher moment of inertia than the induction galvanometer described in my above-referenced United States Patent No. 2,650,348. For the same system-stiffness this additional moment will require a proportionate increase in the damping force for good performance. Where shunting resistance is effective in the previous case it is here desirable to provide dynamic damping. This is done by means of the damping amplifier which comprises a single-stage amplifier tube 50 that is responsive to the output current of the discriminator and which feeds a derivative component into the movable coil 15 of the converter element 41. A potential is derived by passing the output current through a load resistor 52 and such potential is applied to the converter element movable coil 15 through a differentiating capacitor 53 having a time-constant against the plate network somewhat larger than the feedback period of the overall system. This supplies a time-derived leading component through the movable coil 15 in response to output current change. An additional input network connected to the plate voltage supply, and including the resistors 54, 55 and the capacitor 56, has a time-constant much larger than the feedback period and serves to compensate for plate supply ripple and transient components. Alternatively, a pentode connection with a regulated screen supply could be used for this purpose but such an arrangement is not as simple or effective. The degree of damping is controlled by adjusting values of the resistor 52 and capacitor 53 to obtain a magnitude and time-constant that is an optimum for the particular dynamometer-converter elements used and the actual feedback ratio. The plate circuit compensating network is adjusted to the point of disappearing transfer impedance between the plate supply and movable coil circuits at frequencies at least somewhat lower than the reciprocal of the feedback period. It will be noted that the damping circuit is reactively coupled and so cannot produce any D. C. displacement error in the converter element.

From the above description it is apparent that my system includes position sensing, by the converter element, and amplification to provide an automatic response whereby the D. C. output current, as measured by the instrument 60, is equal at all times to the product of the two input currents, fed to the dynamometer element, multiplied by a constant. In the particular system illustrated in the drawings, the input demand for high performance is about 0.6 watt for the field circuit and about 0.05 watt for the movable coil circuit. The maximum continuous rating from the thermal rise standpoint is about 2 watts and 0.2 watt, respectively. Further, the input impedances are a matter of coil windings and may be designed over wide ranges and combinations. The output current range is a matter of amplifier design and may be made 1 milliampere or higher. Actually, the normal range of the illustrated system is 1 milliampere but higher ranges may be provided by inserting an accessory amplifier between the normal amplifier output and the converter element.

The system has two inherent performance features that are desirable or even necessary for many applications, as follows:

(a) The input circuit and the output circuit are mutually decoupled and have no common electrical connection. All three circuits may therefore be at differing potential levels and, furthermore, will not couple through their respective source or load impedances.

(b) The converter element is a linear D. C. mechanism with a strict ability to average on a precisely first-power basis. This means that the system will provide precise static indication of input product recurrent rates-of-change large without limit with respect to the feedback period. Thus, the input currents may have frequencies high with respect to the reciprocal feedback period without developing averaging error. The system in fact has the ability of a conventional D. C. mechanism to average fast recurrent components. The practical upper frequency characteristics are, therefore, entirely a function of the complex impedances of the coils in the dynamometer element.

From a qualitative performance standpoint, the dynamic resolution time of the system, assuming proper damping, is expressible in terms of the feedback period. It is, effectively, a critically damped harmonic system with the feedback period an exponential time-constant. So, for example, the step-function response time would be about $2\pi$ times the feedback period. The attainable feedback period is mainly a matter of the phase velocity of the high-frequency amplifier and the damping adjustment, and is normally of the order of 5 milliseconds; the equivalent step function response time is therefore about 30 milliseconds. This could easily be reduced by raising the operating frequency or otherwise increasing the bandwidth of the high-frequency amplifier section.

The static resolution accuracy is a composite function of the stability of the dynamometer element, the converter element and the feedback ratio. The feedback ratio is made sufficiently large to become a negligible influence relative to the stability factors, and so the overall accuracy becomes a function of the rather predictable stabilities of a dynamometer mechanism and a permanent-magnet D. C. mechanism. In good practice these may be considered reliable on a permanent basis to within 0.1% including reasonable ambient temperature excursions. The spot-adjusted accuracy is limited only by the feedback ratio, which is considered beyond any ordinary ability of adjustment.

The system has been described specifically as a high-resolution product resolver for analog computer service. Its permanent stability of 0.1% or better and its response period of a few milliseconds is sufficient for most purposes, and the device is considerably simpler than other contemporary devices such as those using servo-operated log rheostats. However, the system is applicable generally to precise *rms* A. C. measurements (such as current, potential, power and reactive power) but it is not particularly applicable to phase angle or frequency measurements. Because of the increased efficiency of the dynamometer element relative to deflection instruments the system offers the basic advantages of accuracy and useful frequency range. A precision D. C. potentiometer may be used not only to standardize the system but also to take actual readings.

The zero position of the system may be suppressed for narrow-range indication of A. C. voltage, for example, power system voltage. Such suppression may be in the form of a regulated D. C. suppression current applied to the output circuit or of mechanical spring suppression applied to the movable coil of the converter element. Power system voltage may, for example, be indicated on a switchboard instrument having an accuracy of 1% and a scale range of 110–120 volts, or 11 scale lengths suppression, and the overall precision will be better than 0.1%.

While, in Figure 4, I show a D. C. indicating instrument 60 responsive to the output current of the system, it is apparent that the output may be applied to D. C. recorders, of the potentiometric or direct-writing type, particularly in cases where the simpler thermal converter systems are not of sufficient accuracy for the recording of A. C. magnitudes. In the case of automatic recorders of the potentiometer type the zero may conveniently be suppressed for precision narrow-range work.

The converter element may be included as an *rms* detecting element in automatic A. C. regulating systems thereby permitting the use of a precise D. C. current for a reference level. Alternatively, the element may be equipped with a torque spring for a reference level. Also, the system, as described, is directly applicable to current-balance telemetering of A. C. quantities by applying the output current to the line and using a D. C. instrument as a receiver. Where required, the D. C. output current may be converted to an alternating current, or pulses, for application to standard telephone or microwave circuits. In a broad sense, any telemetering system capable of accepting D. C. current may be extended to A. C. circuits by use of my system.

Further, those skilled in this art will understand that the primary torque-producing element is not restricted to electrical devices such as the illustrated electrodynamometer as such torque-producing-element may take the form of a Bourdon tube, a bimetallic temperature-sensing element, etc. The torque produced by such elements results in a deflection of the movable coil of the converter element, thereby producing an A.-C. component which is amplified and rectified to produce a single output current that is a linear function of the torque produced by the primary torque-producing element.

Reference is now made to Figure 5 which is an isometric view showing the structural arrangement of the dynamometer and converter elements. The converter element 41 is supported from a base 62 by the studs 63, the base 62 carrying a jewel screw that serves as the lower bearing for the staff 12 to which the movable coil 15 is secured. The upper bearing for the staff 12 is carried by a double bridge 64 that is secured to the arms 65 by the screws 66, said arms being secured to the upright posts 67, made of non-magnetic material such as brass. Those skilled in this art will understand that the bridge 64 comprises two cross members electrically insulated from each other and from the arms 65 by a conventional arrangement of insulating tubes, washers and strips and that each of the two abutments 68, 69 is in electrical contact only with one of such members. In accordance with conventional practice, each of the filamentary hair springs 70, 71 has an outer end soldered to one of the abutments and an inner end soldered to suitable terminals carried by an insulator tube 73 that is secured to the staff 12. The ends of the dynamometer movable coil 11 are soldered to such terminals, the entire assembly being such that current is conducted to the movable coil by leads attached to the terminals 74, 75. The field coils 10 are positionally supported by insulator plates 76 which are, in turn secured to the upright posts 67. Suitable terminals, such as the terminal 77 visible in the drawing, are secured to the post 67 but insulated therefrom and serve as a means for connecting the field coils into an external circuit. Since the movable coil 11 is subjected only to a negligible displacement angle the dynamometer element is designed for maximum differential coupling by flattening and compacting the field coils about the movable coil thereby providing an efficiency gain of about 3 over a conventional deflection instrument of comparable size. Also, the mechanism operates at the point of zero mutual inductance thereby eliminating coupling errors as normally experienced in deflection instruments. It is here also pointed out that the movable coils of the dynamometer and converter elements are positioned at right angles to each other to reduce any magnetic cross influence. Magnetic shielding of the dynamometer element is accomplished to a practical extent by the rectangular shield 80 made of ferrite. Further shielding of the entire device may be provided by a cup-shaped cover adapted to enclose the device and having ends secured to the circular base 62 by suitable screws threaded into holes 81.

Current is fed to the movable coil of the converter element through the hair springs 85 which are similar to the dynamometer springs 70, 71 and which have outer ends soldered to the free ends of the metal strips 86, 87. The other ends of these metallic strips are secured to the upright posts 67 but insulated therefrom. As already explained, I prefer to make the movable coil of the converter element round rather than rectangular with the shaft 12 passing therethrough. In this way I avoid coil compliance by coil distortion under torque. The A.-C. field coils 30, 31 of the converter element have already been described with specific reference to Figures 2 and 3. Secured at the lower portion of the shaft 12 is an arm 90 movable within a range defined by the adjustable stops 91 that are carried by the base 62. The purpose of this arrangement is to limit the maximum deflection of the movable system.

Since the device is subject to position error and vibration it should be located properly and leveled. Toward the latter end I mount the device on a triangular platform 95 provided with conventional thumb-operable members 96 each individually adjustable to level the platform as indicated by a small spirit level 97 that is secured to the platform surface. The entire device may be located at a point remote from the amplifier and the point of observation.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A system for producing an output current that is a function of a mechanical torque, said system comprising a primary torque-producing element, a staff mechanically coupled to said primary torque-producing element and rotatable in direction and magnitude in response to the torque of the said torque-producing element, electromagnetic means mechanically coupled to said staff and developing an alternating current component having a magnitude and phase sense relating to rotation of said staff, means phase-rectifying the said alternating current component to produce a corresponding output current; and means feeding said output current back into said electromagnetic means to return said staff to its initial position.

2. The invention as recited in claim 1, wherein the said electromagnetic means includes a wire-wound movable coil secured to the said staff and rotatable in a composite flux field that includes a unidirection and an alternating magnetic flux, and the said alternating component is developed in the movable coil upon rotation thereof, and the said output current is fed back to the said movable coil.

3. The invention as recited in claim 1, wherein the said primary torque-producing element is an electrodynamometer mechanism having a movable coil secured to the said staff.

4. A system for producing a single output current that is a product function of two input currents, said system comprising an electrodynamometer mechanism including a field coil and a movable coil individually energized by the input currents; a staff secured to the said movable coil; a converter mechanism including a permanent magnet providing a steady magnetic flux across an air gap, a movable coil secured to said staff and rotatable in said air gap, and a field coil energized by a high-frequency current and producing an alternating magnetic flux field in said air gap, said movable coil of the converter mechanism having a normal position of zero coupling with said alternating flux field; means amplifying the A. C. component of voltage induced in said converter mechanism movable coil when the latter is displaced from its normal position; a discriminator phase-rectifying the said A. C. component of voltage to produce an output current that varies in polarity and magnitude with the displacement of the converter movable coil from its normal position; and a feedback circuit for feeding the said output current into the movable coil of the converter mechanism in a direction to return such movable coil to its normal position.

5. The invention as recited in claim 4 and including means for dynamically damping movement of the converter element movable coil, said means including an amplifier tube having an input circuit responsive to the said output current of the discriminator and an output circuit connected to the converter element movable coil through a differentiating network, and a power source energizing the electrodes of the tube.

6. The invention as recited in claim 5, including a network coupling the said power source to the said input circuit to produce a condition of substantially zero transfer impedance between the power source and the said output circuit.

References Cited in the file of this patent

UNITED STATES PATENTS

| | | |
|---|---|---|
| 1,929,431 | Hyland | Oct. 10, 1933 |
| 2,068,116 | Shotter | Jan. 19, 1937 |
| 2,459,106 | Hardy | Jan. 11, 1949 |
| 2,535,250 | Allen | Dec. 26, 1950 |
| 2,667,071 | Ramey et al. | Jan. 26, 1954 |
| 2,686,635 | Markson | Aug. 17, 1954 |

OTHER REFERENCES

"An Electro-Mechanical Multiplier for Analog Computer Application" (Samuel E. Dorsey), Proceedings of Electronic Computer Symposium, Los Angeles, California (sponsored by IRE); April 30, 1952, pages relied on V-1–V-7.